United States Patent Office
3,148,178
Patented Sept. 8, 1964

3,148,178
AZO COMPOUNDS CONTAINING A
DICARBOXIMIDO RADICAL
David J. Wallace and James M. Straley, Kingsport, Tenn., assignors to Eastman Kodak Company, Rochester, N.Y., a corporation of New Jersey
No Drawing. Filed Nov. 7, 1962, Ser. No. 236,135
7 Claims. (Cl. 260—152)

This invention relates to novel compounds containing a dicarboximido radical, and more particularly to azo compounds, such as azo dyestuffs, containing a dicarboximido radical. Particular azo compounds containing this radical include compounds obtained by coupling diazotized anilines with dicarboximidoalkyl aniline coupling components such as N-[2(N-ethyl-m-toluidine)-ethyl]phthalimide.

These particular azo compounds have the general formula (I)  R—N=N—R₁—N(R₂)—R₃—Z wherein R = a monocyclic aryl radical of the benzene series derived from a diazotized aniline such as 2-amino-5-nitrophenylmethyl sulfone and other anilines described in the examples below.

R₁ = a monocyclic aromatic radical of the benzene series including phenylene, -m-CH₃C₆H₃—, e.g., m-tolylene

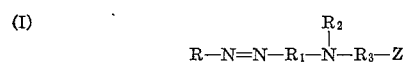

-o-CH₃C₆H₃—, -o-ClC₆H₃—, -m-ClC₆H₃—, - 2,5 - di-(OCH₃)C₆H₂—, 2,5-di-ClC₆H₂—, -o-OCH₃H₃—, etc. derived from the aniline coupling components of the invention.

R₂ = a hydrogen atom or lower alkyl group such as straight and branch-chained lower alkyl groups including substituted lower alkyl groups, e.g., methyl, ethyl, propyl, iso-propyl, butyl, iso-butyl; hydroxyalkyl e.g., hydroxyethyl; cyanoalkyl, e.g., cyanoethyl; alkoxyalkyl, e.g., methoxyethyl; aryloxyalkyl, e.g., phenoxyethyl; acyloxyalkyl and haloalkyl, R₃ = an alkylene radical straight or branch-chained, particularly lower alkylene, such as —(CH₂)ₙ—, wherein n is a positive integer from 1 to 4, Z = a dicarboximido radical such as phthalimido, succinimido, maleimido, citraconimido, etc, as indicated in the table below, derived from the corresponding anhydride.

The azo compounds should be free of water-solubilizing groups when used for dyeing hydrophobic fibers, yarns and fabric such as acrylic and polyester fibers and possess the valuable property of staining wool fibers only slightly and are easily cleared. The dyes give fast yellow to violet shades on such fibers and in general exhibit good fastness, for example, to light, gas (atmospheric fumes), washing and sublimation.

The dicarboximidoalkyl aniline coupling components of the invention which are coupled with the diazotized anilines have the following general formula (II)  H—R₁—N(R₂)—R₃—Z wherein R₁, R₂, R₃ and Z have the same meaning as given above and R₁ is not substituted in the diazo coupling position.

The dicarboximido radical Z of the azo compounds and coupling components of Formulas I and II above, has the following general formula

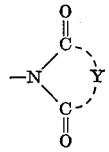

wherein Y represents the atoms necessary to complete a ring containing 4 or 5 carbon atoms, in addition to the nitrogen atom, i.e., the hydrocarbon residue of the dicarboxylic acid anhydride from which the radical is derived including substituted and unsubstituted alkylene, vinylene and ortho-phenylene, such as —CH₂—CH₂— in the succinimido radical

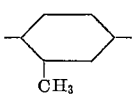

The aniline coupling components are obtained as described in the following typical reaction by the condensation of a dicarboxylic acid anhydride with aminoalkylanilines.

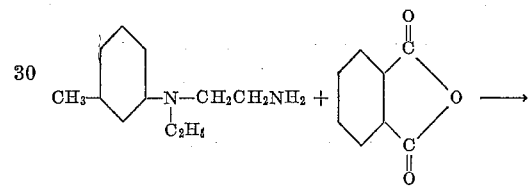

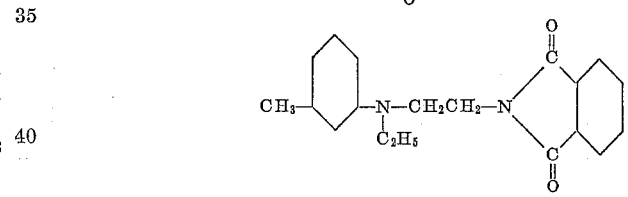

Representative 5- and 6-membered cyclic dicarboximidoalkyl aniline couplers referred to in the table and examples below useful for preparing the azo compounds are N-[2(N-ethyl-m-toluidine)ethyl]phthalimide
N-[2(N-ethylanilino)ethyl]succinimide
N-[2(N-ethyl-m-toluidine)ethyl]tetrachlorophthalimide
N-[2(N-butyl-m-toluidine)ethyl]succinimide
N-[2(N-ethyl-m-toluidine)ethyl]bicyclo[2,2,1]-5-heptene-2,3-dicarboximide
N-[2(N-ethyl anilino) propyl]succinimide
N-[2-(N-ethyl-m-toluidine)ethyl]cyclohexane-1,2-dicarboximide
N-[2(N-ethyl-m-toluidine)ethyl]citraconimide
N-β-glutarimidoethyl-N-ethyl-m-toluidine
N-ethyl-N-succinimidomethylaniline
N-α-chloro-β-hydroxypropyl-N-β-succinimidoethyl-m-toluidine
N-β-acetoxyethyl-N-β-succinimidoethyl-m-toluidine
N-ethyl-N-phthalimidomethyl-m-toluidine The following examples will serve to illustrate the preparation of representative intermediate and azo compounds of our invention.

EXAMPLE 1

A. 89 g. (0.5 m.) of N-β-aminoethyl-N-ethyl-m-toluidine and 74 g. (0.5 m.) of phthalic anhydride were mixed intimately and heated gradually until an exothermic reaction began. The temperature rose to 120° C. without further heating. After the temperature began to fall heat was applied and held at 130–140° C. for 1 hour. The partially cooled melt was drowned in 500 cc. of hot ethyl alcohol and allowed to cool. The product was filtered off, washed with a little alcohol and dried at 60° C. The yield was 129 g. of material melting at 86–87° C. According to analysis this product, N-[2(N-ethyl-m-toluidine)ethyl]phthalimide, has the structure

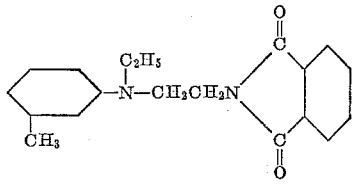

B. A coupler N - [2(N-ethyl - m - toluidine)ethyl]succinimide was prepared as in A except that the anhydride used was 50 g. (0.5 m.) of succinic anhydride and after the heating period the mix was drowned in 1 liter of water. Yield=99 g., melting at 81.5–82.5° C.

C. 44.5 g. of the amine used in A and B, and 71.5 g. (0.25 m.) of tetrachlorophthalic anhydride were heated at 140–150° C. for about an hour, allowing the water formed to distill off. The mixture solidified, and after cooling, was pulverized and then recrystallized from 750 cc. of dimethyl formamide. The yellow solid was collected by filtration, washed with water, and dried at 100° C. The product melted at 194–6° C. and analysis showed it to be the tetrachloro derivative of the product of A, N-[2(N-ethyl-m-toluidine)ethyl]tetrachlorophthalimide.

D. 4-carboxyphthalic anhydride was used as in A in place of phthalic anhydride to obtain the imide N-[2(N-ethyl-m - toluidine)ethyl] - 4 - carboxyphthalimide, M.P. 160–162° C.

E. 1,2,3,6-tetrahydrophthalic anhydride was used as in A to produce the imide N-[2(N-ethyl-m-toluidine)ethyl]-1,2,3,6-tetrahydrophthalimide, M.P. 76–77.5° C.

F. 3-nitrophthalic anhydride was used as in A to produce the imide N-$\beta$-3-nitrophthalimidoethyl-N-ethyl-m-toluidine, M.P. 124–125° C.

G. The compound of F was reduced using $H_2$ and Raney nickel in alcohol to yield the aminophthalic acid imide N-$\beta$-3-aminophthalimidoethyl-N-ethyl-m-toluidine, M.P. 116–117° C.

H. 32.8 g. (0.2 m.) bicyclo[2,2,1]-5-heptene-2,3-dicarboxylic acid anhydride and 35.6 g. (0.2 m.) N-$\beta$-aminoethyl-N-ethyl-m-toluidine were heated together at 130–140° C. for 1 hour. The melt was poured into 200 cc. hot ethanol and allowed to cool over night. The solid was filtered off, washed with ethanol and dried in air. The product N-[2-(N-ethyl - m - toluidine)ethyl]bicyclo[2.2.1] - 5-heptene - 2,3 - dicarboximide melted at 72–73.5° C.

J. When the product of H is heated at 250–75° C. for 10 min. cyclopentadiene is evolved forming N-$\beta$-maleimidoethyl-N-ethyl-m-toluidine.

K. 77 g. (0.5 m.) cyclohexane-1,2-dicarboxylic anhydride was added portionwise to 89 g. (0.5 m.) of N-$\beta$-aminoethyl-N-ethyl-m-toluidine, the temperature rising spontaneously to 125° C. during addition, after which the mix was heated 2 hours at 130–140° C. The viscous product N-[2-(N-ethyl)-m - toluidine)ethyl]cyclohexane-1,2-dicarboximide was distilled collecting the fraction. B. 183–4° C./.59 mm. $N_D^{20}$=1.5559.

L. 32.8 g. (0.2 m.) N-$\beta$-aminoethyl-N-ethyl-aniline and 20 g. succinic anhydride heated with 0.1 g. sulfanilic acid gave the $\beta$-succinimido derivative, M. 70–72° C.

M. N-$\beta$-aminoethyl-o-toluidine and succinic anhydride gave upon heating the corresponding imido compound, M. 131–2° C.

N. 17.8 g. N-$\beta$-aminoethyl-N - ethyl - m - toluidine was added dropwise to 11.2 g. citraconic anhydride. The mix was solid after addition was complete. The mix was heated 1 hour at 140–50° C. and distilled at 146–50° C./2.5 mm.

O. N-$\beta$-aminoethyl-m-toluidine and succinic anhydride upon heating gave the imido derivative melting at 162–5° C.

P. The product of O was treated with ethylene oxide in ethanol to give N-2-hydroxyethyl-N-2-succinimidoethyl-m-toluidine, M. 110–111° C.

Q. 89.0 g. (0.5 m.) N-$\beta$-aminoethyl-N-ethyl-m-toluidine, 57.0 g. (0.5 m.) of glutaric anhydride and 1 g. of sulfanilic acid were heated at 150–160° C. for 1.5 hours. Distillation in vacuo gave 79.6 g. of N-$\beta$-glutarimidoethyl-N-ethyl-m-toluidine, B. 168–71° C./0.5 mm.

R. 23.1 g. (0.1 m.) N-$\beta$-succinimidoethyl-m-toluidine, 4.1 g. cupric acetate monohydrate, 0.1 g. hydroquinone, and 58.3 g. (1.1 m.) acrylonitrile were heated at 80° C. for 24 hours and filtered hot. Upon cooling the product crystallized out, was filtered off and recrystallized twice from ethanol, giving N-$\beta$-cyanoethyl-N-$\beta$-succinimidoethyl-m-toluidine, M. 121–4° C. The starting material was prepared by condensing succinic anhydride with N-$\beta$-aminoethyl-m-toluidine at 150–60° C. and pouring into ethanol.

S. 19.8 g. of succinimide was stirred with 300 cc. of alcohol. After adding 19.6 cc. of 37% formaldehyde the mix was heated to reflux and 27.8 g. of N-ethylaniline added. After 1 hour's additional reflux the alcohol was distilled off and unchanged succinimide removed from the residue by extraction with 200 cc. of 5% NaOH. The product N - ethyl - N - succinimidomethylaniline was washed with water and distilled, collecting the fraction boiling at 152–4° C./0.45 mm.

T. 9.8 g. of 37% formaldehyde was stirred into 14.7 g. phthalimide in 172 cc. of alcohol. The mix was brought to reflux and 15.3 g. N-ethyl-m-toluidine was added. After 30 min. further reflux the solution was chilled and the product isolated by filtration. After recrystallization from alcohol the product N-ethyl-N-phthalimidomethyl-m-toluidine melted at 80–82° C.

U. The product of P was treated with acetic anhydride in acetic acid, drowned in water, filtered and air-dried to yield N-$\beta$-acetoxyethyl-N-$\beta$-succinimidoethyl-m-toluidine.

V. The product of O was treated in benzene with epichlorohydrin and the solvent removed by distallation to yield N-$\alpha$-chloro-$\beta$-hydroxypropyl-N-$\beta$-succinimidoethyl-m-toluidine.

EXAMPLE 2

*Preparation of Azo Compound*

A. A solution of nitrosyl sulfuric acid (prepared by dissolving 0.74 g. sodium nitrite in 5 ml. concentrated sulfuric acid) was cooled in an ice-bath and 10 ml. of 1:5 acid (1 part propionic acid: 5 parts acetic acid) was added below 10° C. The mixture was cooled to 3–5° C. and 2.16 g. (0.01 m.) 2-amino-5-nitrophenylmethylsulfone was added at 3–5° C. Then 10 ml. 1:5 acid was added below 5° C. The diazonium mixture was stirred at 3–5° C. for 1½ hours.

B. 2.6 g. (0.01 m.) N-ethyl-N-$\beta$-succinimidoethyl-m-toluidine, Example 1B, was dissolved in 25 ml. of 1:5 acid, cooled to ice-bath temperature, and the diazonium solution from 2A was added. The coupling solution was neutralized to Congo red paper with solid ammonium acetate, then allowed to couple 2 hours. The mixture was drowned with water, filtered, washed with water, and dried. The product dyes polyester and cellulose acetate fibers a bright violet shade of excellent fastness properties.

The dye has the structure

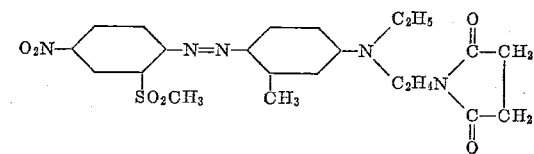

EXAMPLE 3

A. 3.11 g. (0.015 m.) 2,6-dichloro-4-nitroaniline was stirred for 15 minutes in a solution of 21 ml. concentrated sulfuric acid in 36 ml. of water. The slurry was cooled to about —5° C. and a solution of 1.1 g. sodium nitrite in 7.5 ml. conc. sulfuric acid was added below 0° C. The diazotization was stirred at 0–5° C. for 2 hours, then filtered to remove a few insoluble particles.

B. 3.9 g. (0.015 m.) N-ethyl-N-β-succinimidoethyl-m-toluidine was dissolved in 100 ml. of 15% aqueous sulfuric acid. This solution was cooled to 3–5° C. and the diazonium solution from 3A was added, and the coupling solution was neutralized with solid ammonium acetate. After coupling 2 hours at ice-bath temperature, the reaction was drowned in water, filtered, the cake washed with water, and dried. The product dyes cellulose acetate and polyester fibers desirable brown shades of excellent fastness properties.

EXAMPLE 4

2.16 g. (0.01 m.) 2-amino-5-nitrophenylmethylsulfone was diazotized and coupled as in Example 2 with 3.08 g. (0.01 m.) N-β-phthalimidoethyl-N-ethyl-m-toluidine. The resulting dye weighed 3.7 g. and dyed polyester fibers violet shades of good fastness properties.

EXAMPLE 4a 2.16 g. (0.01 m.) 2-amino-5-nitrophenylmethylsulfone was diazotized and coupled as in Example 2 with 2.58 g. (0.01 m.) N-maleimidoethyl-N-ethyl-m-toluidine. The yield of dye was 4.0 g. It dyed polyester fibers violet shades of good fastness properties.

EXAMPLE 4b 6.90 g. of 4-nitroaniline was dissolved in 5.4 cc. conc. $H_2SO_4$ and 12.6 cc. of water, and the solution poured over 50 g. of crushed ice. A solution of 3.6 g. $NaNO_2$ in 8 cc. of water was stirred in and held at 0–5° C. for 2 hours. The solution was filtered and run into 14.7 g. N-ethyl-N-phthalimidomethyl-m-toluidine in 25 cc. of 1:5 propionic-acetic acid below 5° C. The mineral acid was neutralized with ammonium acetate crystals. After 2 hours at ice-bath temperatures the mix was drowned in water, filtered, washed and air-dried. The product 4-(4'-nitrophenylazo)-N-ethyl-N-phthalimidomethyl - m - toluidine dyes polyesters in bright orange shades.

EXAMPLE 4c

A. 3.11 g. (0.015 m.) 2,6-dichloro-4-nitroaniline was stirred for 15 minutes in a solution of 21 ml. conc. sulfuric acid in 36 ml. of water. The slurry was cooled to about —5° C. and a solution of 1.1 g. sodium nitrite in 7.5 ml. conc. sulfuric acid was added below 0° C. The diazotization was stirred at 0–5° C. for 2 hours, then filtered to remove a few insoluble particles.

B. 4.15 g. (0.015 m.) N-β-hydroxyethyl-N-β-succinimidoethyl-m-toluidine was dissolved in 100 ml. of 15% aqueous sulfuric acid. This solution was cooled to 3–5° C. and the diazonium solution from A was added, and the coupling solution was neutralized with solid ammonium acetate. After coupling 2 hours at ice-bath temperature, the reaction was drowned in water, filtered, the cake washed with water, and dried. Yield 5.6 g. The product dyes cellulose acetate and polyester fibers desirable brown shades of excellent fastness properties.

EXAMPLE 4d

A. 3.11 g. (0.015 m.) 2,6-dichloro-4-nitroaniline was stirred for 15 minutes in a solution of 21 ml. conc. sulfuric acid in 36 ml. of water. The slurry was cooled to about —5° C. and a solution of 1.1 g. of sodium nitrite in 7.5 ml. conc. sulfuric acid was added below 0° C. The diazotization was stirred at 0–5° C. for 2 hours, then filtered to remove a few insoluble particles.

B. 3.63 g. (0.015 m.) N-β-succinimidoethyl-o-toluidine was dissolved in 100 ml. of 15% aqueous sulfuric acid. This solution was cooled to 3–5° C. and the diazonium solution from A was added, and the coupling solution was neutralized with solid ammonium acetate. After coupling 2 hours at ice-bath temperature, the reaction was drowned in water, filtered, the cake washed with water, and dried. Yield 5.4 g. The product dyes cellulose acetate and polyester fibers desirable brown shades of excellent fastness properties.

EXAMPLE 4e

A. 2.07 g. (0.015 m.) 4-nitroaniline was stirred for 15 minutes in a solution of 21 ml. conc. sulfuric acid in 36 ml. of water. The slurry was cooled to about —5° C. and a solution of 1.1 g. sodium nitrite in 7.5 ml. conc. sulfuric acid was added below 0° C. The diazotization was stirred at 0–5° C. for 2 hrs., then filtered to remove a few insoluble particles.

B. 4.49 g. (0.015 m.) N-β-cyanoethyl-ethyl-N-β-succinimidoethyl-m-toluidine was dissolved in 100 ml. of 15% aqueous sulfuric acid. This solution was cooled to 3–5° C. and the diazonium solution from A was added, and the coupling solution was neutralized with solid ammonium acetate. After coupling 2 hours at ice-bath temperature, the reaction was drowned in water, filtered, the cake washed with water, and dried. Yield 5.3 g. The product dyes cellulose acetate and polyester fibers desirable orange shades of excellent fastness properties.

EXAMPLE 4f

A. 2.6 g. (0.015 m.) 2-chloro-4-nitroaniline was stirred for 15 minutes in a solution of 21 ml. conc. sulfuric acid in 36 ml. of water. The slurry was cooled to about —5° C. and a solution of 1.1 g. sodium nitrite in 7.5 ml. conc. sulfuric acid was added below 0° C. The diazotization was stirred at 0–5° C. for 2 hours, then filtered to remove a few insoluble particles.

B. 4.49 g. (0.015 m.) N-β-cyanoethyl-N-β-succinimidoethyl-m-toluidine was dissolved in 100 ml. of 15% aqueous sulfuric acid. This solution was cooled to 3–5° C. and the diazonium solution from A was added, and the coupling solution was neutralized with solid ammonium acetate. After coupling 2 hours at ice bath temperature, the reaction was drowned in water, filtered, the cake washed with water, and dried. Yield 5.6 g. The product dyes cellulose acetate and polyester fibers desirable scarlet shades of excellent fastness properties.

The dyes described in the following table are prepared in the manner of Example 2 wherein $R_1$, $R_2$, $R_3$ and $Z$ refer to the above general formulas, using the appropriate diazotized aniline and dicarboximidoalkyl aniline coupling component of the invention.

Thus, according to Example 5 of the table, 2-methylsulfonyl-4-nitroaniline is diazotized and coupled with the following dicarboximidoalkyl aniline coupling component in which $R_1$=m-tolyl, $R_2$=$CH_3OCH_2CH_2$—,
$R_3$=—$CH_2CH_2$—
and $Z$=phthalimido

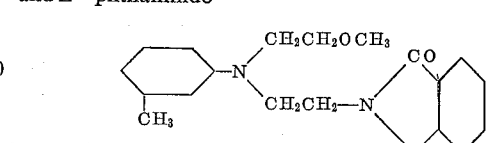

thereby forming the dye

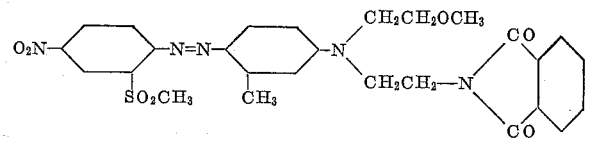

which dyed a polyester fabric a violet color. Similarly in Examples 6–52, the designated aniline is diazotized and coupled with the coupler components indicated.

| Example No. | Aniline Diazotized | Dicarboximidoalkyl aniline coupler | | | Color of Polyester Dyeings |
|---|---|---|---|---|---|
| | | Substituents Phenylene Radical $R_1$ | $R_2$ | $R_3$ | Z | |
| 5 | 2-methylsulfonyl-4-nitro | m-$CH_3$ | $CH_3OCH_2CH_2$— | —$CH_2CH_2$— | Phthalimido | Violet. |
| 6 | ----do---- | m-$CH_3$ | Cyclohexyl- | —$CH_2CH_2$— | ----do---- | Do. |
| 7 | ----do---- | H | $C_2H_5$— | —$CH_2CH_2CH_2$— | ----do---- | Do. |
| 8 | ----do---- | o-$CH_3$ | $C_2H_5$— | —$CH_2CH_2$— | ----do---- | Do. |
| 9 | ----do---- | m-Cl | $C_3H_7$— | —$CH_2CH_2$— | ----do---- | Do. |
| 10 | ----do---- | 2,5-di-$OCH_3$ | $C_2H_5$— | —$CH_2CH_2$— | ----do---- | Do. |
| 11 | ----do---- | H | $C_2H_5$— | —$CH_2CH_2$— | Succinimido | Do. |
| 12 | ----do---- | m-$CH_3$ | $C_2H_5$— | —$CH_2CH_2CH_2$— | ----do---- | Do. |
| 13 | ----do---- | m-$CH_3$ | $C_4H_9$— | —$CH_2CH_2$— | ----do---- | Do. |
| 14 | ----do---- | m-$CH_3$ | $C_2H_5$— | —$CH_2CH_2$— | Maleimido | Do. |
| 15 | ----do---- | m-$CH_3$ | $C_2H_5$— | —$CH_2CH_2$— | Nitrophthalimido | Do. |
| 16 | 2-chloro-4-nitro | m-$CH_3$ | $C_2H_5$— | —$CH_2CH_2$— | Succinimido | Pink. |
| 17 | 4-nitro | m-$CH_3$ | $C_2H_5$— | —$CH_2CH_2$— | ----do---- | Orange. |
| 18 | 2,6-dichloro-4-nitro | m-$CH_3$ | $C_2H_5$— | —$CH_2CH_2$— | Phthalimido | Brown. |
| 19 | ----do---- | m-$CH_3$ | $C_2H_5$— | —$CH_2CH_2$— | Maleimido | Do. |
| 20 | ----do---- | m-$CH_3$ | $C_2H_5$— | —$CH_2CH_2$— | Tetrahydro-phthalimido | Do. |
| 21 | ----do---- | m-$CH_3$ | $C_2H_5$— | —$CH_2CH_2$— | Bicyclo[2.2.1]-5-heptene-2,3-dicarboximide. | Do. |
| 22 | ----do---- | m-$CH_3$ | $C_2H_5$— | —$CH_2CH_2$— | Tetrachlorophthalimido | Do. |
| 23 | ----do---- | m-$CH_3$ | $C_2H_5$— | —$CH_2CH_2$— | Citraconimido | Do. |
| 24 | ----do---- | m-$CH_3$ | $C_2H_5$— | —$CH_2CH_2$— | 4-carboxy-phthalimido | Do. |
| 25 | ----do---- | m-$CH_3$ | —$C_2H_4OH$ | —$CH_2CH_2$— | Succinimido | Do. |
| 26 | ----do---- | m-$CH_3$ | —$C_2H_4CN$ | —$CH_2CH_2$— | ----do---- | Do. |
| 27 | ----do---- | o-$CH_3$ | H | —$CH_2CH_2$— | ----do---- | Yellow. |
| 28 | 4-$CH_3$ | m-$CH_3$ | —$C_2H_5$ | —$CH_2CH_2$— | ----do---- | Do. |
| 29 | 4-cyano | m-$CH_3$ | —$C_2H_5$ | —$CH_2CH_2$— | ----do---- | Do. |
| 30 | 4-$SO_2NH_2$ | m-$CH_3$ | —$C_2H_5$ | —$CH_2CH_2$— | ----do---- | Orange. |
| 31 | 4-$CF_3$ | m-$CH_3$ | —$C_2H_5$ | —$CH_2CH_2$— | ----do---- | Do. |
| 32 | 4-$CO_2C_2H_5$ | m-$CH_3$ | —$C_2H_5$ | —$CH_2CH_2$— | ----do---- | Yellow. |
| 33 | 2-$CH_3SO_2$-4-$NO_2$ | m-$CH_3$ | $C_2H_5$— | —$CH_2CH_2$— | Hexahydrophthalimido | Violet. |
| 34 | 2-$CH_3SO_2$-4-$NO_2$ | o-$CH_3$ | H | —$CH_2CH_2$— | Succinimido | Red. |
| 35 | 2-$CH_3SO_2$-4-$NO_2$ | m-$CH_3$ | $C_2H_5$— | —$CH_2CH_2$— | Tetrahydrophthalimido | Violet. |
| 36 | 2-$CH_3SO_2$-4-$NO_2$ | m-$CH_3$ | $C_2H_5$— | —$CH_2CH_2$— | ----do---- | Do. |
| 37 | 2-$CH_3SO_2$-4-$NO_2$ | m-$CH_3$ | $C_2H_5$— | —$CH_2CH_2$— | Citraconamido | Do. |
| 38 | 2-$CH_3SO_2$-4-$NO_2$ | m-$CH_3$ | $C_2H_5$— | —$CH_2CH_2$— | 4-carboxyphthalimido | Do. |
| 38a | 2,6-di-Cl-4-$NO_2$ | m-$CH_3$ | $C_2H_5$— | —$CH_2CH_2$— | Glutarimido | Brown. |
| 39 | 2-$CF_3$-4-$NO_2$ | o-Cl | H | —$CH_2\overset{CH_3}{\underset{CH_3}{C}}H$— | Maleimido | Red. |
| 40 | 2,4-di-$NO_2$ | o-$OCH_3$ | H | —$CH_2OH$— | Succinimido | Do. |
| 41 | 2-Br-4-$NO_2$ | H | $C_6H_5$ | —$CH_2CH_2$— | Phthalimido | Violet. |
| 42 | 2-$OCH_3$-4-$NO_2$ | m-$C_2H_5$ | $CH_2CH_2Cl$ | —$CH_2\overset{CH_3}{C}HCH_2$— | Succinimido | Red. |
| 43 | 2-4-dinitro-6-ethyl sulfamoyl | m-$CH_3$ | $C_2H_5$— | —$CH_2CH_2$— | ----do---- | Blue. |
| 44 | None | m-$CH_3$ | $C_2H_5$— | —$CH_2CH_2$— | ----do---- | Yellow. |
| 45 | p-Benzamido | m-$CH_3$ | $C_2H_5$— | —$CH_2CH_2$— | ----do---- | Do. |
| 46 | m-Sulfamoyl | m-$CH_3$ | $C_2H_5$— | —$CH_2CH_2$— | ----do---- | Do. |
| 47 | o-Methylsulfonyl | m-$CH_3$ | $C_2H_5$— | —$CH_2CH_2$— | ----do---- | Do. |
| 48 | p-N,N-dimethylsulfamoyl | m-$CH_3$ | $C_2H_5$— | —$CH_2CH_2$— | ----do---- | Do. |
| 49 | None | m-$CH_3$ | $C_2H_5$— | —$CH_2CH_2$— | Phthalimido | Do. |
| 50 | 4-$NO_2$ | m-$CH_3$ | $CH_2CH_2OOCCH_3$— | —$CH_2CH_2$— | Succinimido | Orange. |
| 51 | 4-$NO_2$ | m-$CH_3$ | $CH_2\overset{OH}{C}HCH_2Cl$— | —$CH_2CH_2$— | ----do---- | Do. |
| 52 | 4-$NO_2$ | m-$CH_3$ | $C_2H_5$— | —$CH_2$— | ----do---- | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye polyester textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, textile material which can be dyed with the new azo compounds, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula

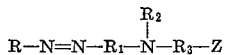

wherein
R = a benzene radical,
$R_1$ = a monocyclic aromatic radical,
$R_2$ = a member of the class consisting of hydrogen, alkyl, hydroxyalkyl, alkoxyalkyl, phenoxyalkyl, acyloxyalkyl, haloalkyl, cyanoalkyl, phenyl, cyclohexyl, the alkyl groups of which are lower alkyl,
$R_3$ = lower alkylene, and
Z = a dicarboximido radical,
said compounds being free of water-solubilizing groups.

2. Azo compounds having the general formula
wherein

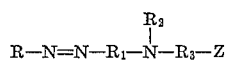

R = a benzene radical,
$R_1$ = a monocyclic aromatic radical,
$R_2$ = lower alkyl
$R_3$ = —$CH_2CH_2$—, and
Z = a succinimido radical,
said compounds being free of water-solubilizing groups 3. A compound having the formula

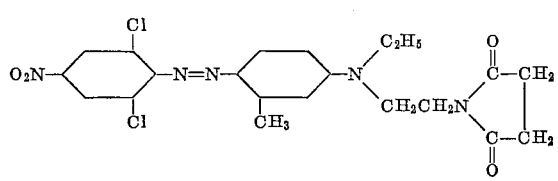

4. A compound having the formula

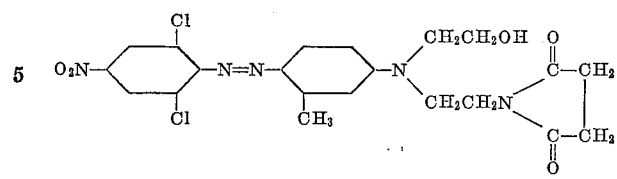

5. A compound having the formula

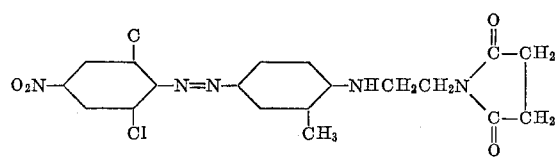

6. A compound having the formula

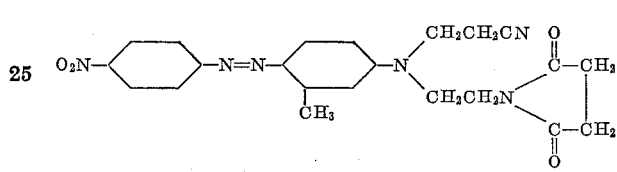

7. A compound having the formula

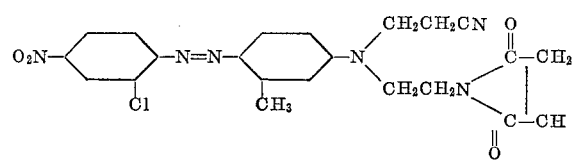

No references cited.

UNITED STATES PATENT OFFICE
CERTIFICATE OF CORRECTION

Patent No. 3,148,178                          September 8, 1964

David J. Wallace et al.

It is hereby certified that error appears in the above numbered patent requiring correction and that the said Letters Patent should read as corrected below.

Column 1, line 37, for "-o-OCH$_3$H$_3$-" read -- -o-OCH$_3$C$_6$H$_3$- --; column 10, lines 13 to 18, the left-hand portion of the formula should appear as shown below instead of as in the patent:

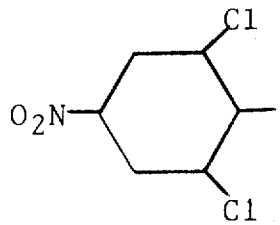

same column 10, lines 33 to 49, the right-hand portion of the formula should appear as shown below instead of as in the patent:

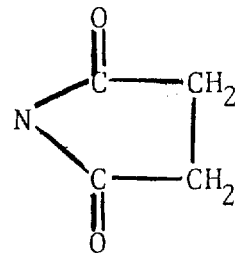

Signed and sealed this 11th day of May 1965.

(SEAL)
Attest:

ERNEST W. SWIDER                        EDWARD J. BRENNER
Attesting Officer                     Commissioner of Patents